United States Patent
Ould-Brahim

(10) Patent No.: US 7,593,395 B2
(45) Date of Patent: Sep. 22, 2009

(54) APPARATUS AND METHOD FOR DISTRIBUTING LAYER-2 VPN INFORMATION

(75) Inventor: Hamid Ould-Brahim, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 998 days.

(21) Appl. No.: 10/747,968

(22) Filed: Dec. 29, 2003

(65) Prior Publication Data

US 2005/0141435 A1 Jun. 30, 2005

(51) Int. Cl.
*H04L 12/28* (2006.01)
*H04J 3/16* (2006.01)
*G06F 15/173* (2006.01)

(52) U.S. Cl. .................. 370/389; 370/401; 370/466; 709/238

(58) Field of Classification Search ............... 370/252, 370/254–255, 400–401, 409, 466–467, 389, 370/351, 465; 709/227, 238, 223, 245, 230, 709/201
See application file for complete search history.

(56) References Cited

U.S. PATENT DOCUMENTS

| | | | |
|---|---|---|---|
| 6,810,417 B2 * | 10/2004 | Lee | 709/220 |
| 7,136,374 B1 * | 11/2006 | Kompella | 370/352 |
| 7,152,115 B2 * | 12/2006 | Ould Brahim et al. | 709/238 |
| 7,274,704 B1 * | 9/2007 | Ould-Brahim et al. | 370/409 |
| 2003/0123446 A1 | 7/2003 | Muirhead et al. | |
| 2003/0142674 A1 | 7/2003 | Casey | |
| 2003/0177221 A1 * | 9/2003 | Ould-Brahim et al. | 709/223 |
| 2003/0228147 A1 * | 12/2003 | Brahim | 398/50 |
| 2004/0034702 A1 * | 2/2004 | He | 709/224 |
| 2004/0255028 A1 * | 12/2004 | Chu et al. | 709/227 |
| 2005/0044262 A1 * | 2/2005 | Luo | 709/238 |
| 2005/0097203 A1 * | 5/2005 | Unbehagen et al. | 709/223 |

FOREIGN PATENT DOCUMENTS

WO WO 03/079614 9/2003

OTHER PUBLICATIONS

E. Rosen et al., "BGP/MPLS Virtual Private Networks", Mar. 1, 1999, pp. 1-21, XP002163535, Chapters 6, 7.

Senevirathne et al., "IETF Internet Draft: Auto-Discovery of VPLS Membership and Configuration Using BGP-MP", Internet Engineering Task Force Internet Draft, Feb. 2002.

Ould-Brahim et al. "Using BGP as an Auto-Discovery Mechanism for Provider-provisionhed VPNs", Internet Engineering Task Force, Internet Draft Provider Provisioned VPN WG, May 2003.

(Continued)

*Primary Examiner*—Nittaya Juntima
(74) *Attorney, Agent, or Firm*—Ridout & Maybee LLP

(57) ABSTRACT

An apparatus and a method for distributing layer-2 VPN information are disclosed. The apparatus is incorporated in a network, and the network includes a first carrier network. The first carrier network is employed by a layer-1 VPN service provider. Layer-1 VPN information is created within the first carrier network. The network also includes a second carrier network. The second carrier network is employed by a different service provider. Layer-2 VPN information is created within the second carrier network. A BGP session is used in transmitting layer-2 VPN information from the second carrier network to the first carrier network.

6 Claims, 2 Drawing Sheets

OTHER PUBLICATIONS

International Search Report, Mar. 2005.

Andersson, L. (Ed.), "PPVPN L2 Framework", Aug. 20, 2002.

Awduche, D., et al., "RSVP-TE: Extensions to RSVP for LSP Tunnels", Dec. 2001.

Bates, T., et al., "Multiprotocol Extensions for BGP-4", Feb. 1998.

Berger, L. (Ed.), "Generalized Multi-Protocol Label Switching (GMPLS) Signaling Resource ReserVation Protocol-Traffic Engineering (RSVP-TE) Extensions", Jun. 2003.

Martini, L., et al., "Pseudowire Setup and Maintenance using LDP", Jun. 2003.

Martini, L., et al., "Transport of Layer 2 Frames Over MPLS", Apr. 2003.

Ould-Brahim, H., et al., "GVPN: Generalized Provider-provisioned Port-based VPNs using BGP and GMPLS", Apr. 2002.

Ould-Brahim, H., et al., "Using BGP as an Auto-Discovery Mechanism for Network-based VPNs", Jan. 2002.

Rosen, E.C. et al., "Provisioning Models and Endpoint Identifiers in L2VPN Signalling", Sep. 2003.

\* cited by examiner

APPARATUS AND METHOD FOR DISTRIBUTING LAYER-2 VPN INFORMATION

FIELD OF THE INVENTION

This invention relates to virtual private networks (VPNs) and, in particular, a method for outsourcing layer-2 VPN auto-discovery to a layer-1 and/or (G)MPLS-based VPN discovery mechanism.

BACKGROUND OF THE INVENTION

Many definitions of VPNs can be considered:

Definition 1: A VPN is a set of users (devices attached to the network) sharing common membership information and intended to establish inter-site connectivity (within that group). A user can be a member of multiple groups (VPNs).

Definition 2: A VPN is a client private network that subscribes to restricted connectivity services.

Definition 3: A VPN is a service where a customer requests multi-site connectivity services provided through a shared network infrastructure.

Definition 4: A VPN is a service where a partition of internal provider network resources is allocated to a customer.

Using specialized tunneling protocols and optionally secured encryption techniques, data integrity and privacy may be maintained in a VPN.

Categories of VPNs include layer-1, layer-2 and layer-3. "Layer-n" is in reference to the network layer used to perform the hand-off between the customer and provider network.

Layer-1 VPNs can be simple, point-to-point connections such as leased lines, ISDN links, or dial-up connections or Sonet/SDH/Optical private lines. They are known to be simple for the provider, as they place all responsibility for operating the network over the connection on the customer. In other words, the customer needs to provide and manage all the routing and switching equipment that operates over the connection.

Layer-2 VPN is a VPN in which the service provider connects customer sites using leased circuits connecting into a point of presence (POP) or node on a shared core network. Layer-2 VPNs are typically based on Frame Relay, ATM, or Ethernet. Exemplary VPN mechanisms at layer-2 include virtual private LAN service (VPLS) (see Waldemar Augustyn et al, "Requirements for Virtual Private LAN Services (VPLS)", October 2002) and virtual private wire (VPW) (see Eric Rosen et. al, "L-2 VPN Framework", February 2003).

Layer-3 VPN is a VPN in which the service provider either supplies a leased IP-based circuit connection between the customer site and the nearest POP on the edge of the service provider network or the client outsource its layer-3 network to the service provider with respect to private route distribution. The service provider takes care of the routing and addressing of the customer traffic. The service provider distributes the IP addressing information for a company across all of its relevant sites. Exemplary VPN mechanisms at layer-3 include virtual routing (VR)—base mechanisms, such as VR using border gateway protocol (BGP) (see Hamid Ould-Brahim et al "Network-based IPN VPN Architecture using Virtual Routers", July 2002) or VPN-based RFC 2547 bis (see Eric Rosen, et al, "BGP/MPLS VPNs", October 2002).

There are various possible arrangements for unifying different types of VPNs. In one known network arrangement, two carriers are provided. The first carrier is a provider providing layer-2, or layer-2 and layer-3 VPN services. The second carrier is a sub-provider providing layer-1 or Generalized VPN (GVPN) services. GVPN service (which in this case the first carrier subscribes to) is a VPN service that uses BGP as a VPN auto-discovery (VPN discovery is a process in which VPN routing information is distributed) and generalized multi-protocol label switching (GMPLS) (which will be discussed) as signaling and routing mechanisms. GVPN services can be layer-1 and/or layer-2/3 VPNs.

The known methods for running this network arrangement have problems. In at least one known method, a layer-2 provider edge device must implement a level-2 VPN auto-discovery mechanism. Here the operator needs to configure and manage $n^2$ or a large number of BGP with TCP sessions running on layer-2 VPN provider edge devices across layer-1 VPN connections.

SUMMARY OF THE INVENTION

An object of the present invention is to provide an improved apparatus and method for distributing layer-2 VPN information.

A further object of the present invention is to provide a network which simplifies the mode of operations on the layer-2 VPN provider edge-based device by eliminating the need for the layer-2 VPN provider edge-based device to implement a full VPN auto-discovery for layer-2 VPN services. Yet a further object is to provide a network which takes advantage of layer-1 VPN auto-discovery implemented on the carrier network by piggybacking layer-2 information on top of it. Also, the network provides layer-1 VPN providers with the ability to offer added-value services that extend to layer-2 VPN without requiring the layer-1 VPN provider to support and offer a complete suite/solutions of layer-2 VPN connection and services.

The present invention provides a network having the above features and additional advantages which will be evident in the reading of the description and drawings which follow.

According to a first aspect of the present invention, there is disclosed a network that includes a first carrier network. The first carrier network is employed by a layer-1 VPN service provider. Layer-1 VPN information is created within the first carrier network. The network also includes a second carrier network. The second carrier network is employed by a different service provider. Layer-2 VPN information is created within the second carrier network. A BGP session is used in transmitting layer-2 VPN information from the second carrier network to the first carrier network. Note that this session can as well be used for normal BGP related features that include L1VPN discovery mechanism.

In one embodiment, an auto-discovery mechanism for the second carrier network is outsourced to the first carrier network.

According to another aspect of the invention, there is disclosed a method for distributing layer-2 VPN information including the steps of:

(1) using BGP sessions and a discovery mechanism of a layer-1 provider edge device to distribute received layer-2 VPN information to a remote layer-1 provider edge device;

(2) passing the layer-2 VPN information from the remote layer-1 provider edge device to an attached layer-2 provider edge device; and (3) using the layer-2 VPN information to simplify operations for a layer-2 service provider.

In another embodiment, the method further includes the step of advertising layer-2 VPN discovery to the layer-1 provider edge device before the step of using the BGP sessions and the discovery mechanism, and at least one inter-carrier BGP session is a mechanism for the advertising.

According to yet another aspect of the invention, there is disclosed a network including a backbone and at least two provider edge devices. The at least two provider edge devices are connected to and work with the backbone. Layer-1 and layer-2 VPN information is processed by one of the at least two provider edge devices. This provider edge device has a discovery mechanism for distributing the layer-2 VPN information.

In an alternative embodiment, the at least two provider edge devices are a part of a network of a first service provider, and both layer-1 and layer-2 VPN auto-discovery are carried out within the network of the first service provider.

Further features and advantages will become apparent from the following detailed description taken in conjunction with the accompanying drawings.

DETAILED DESCRIPTION

Figure 1:
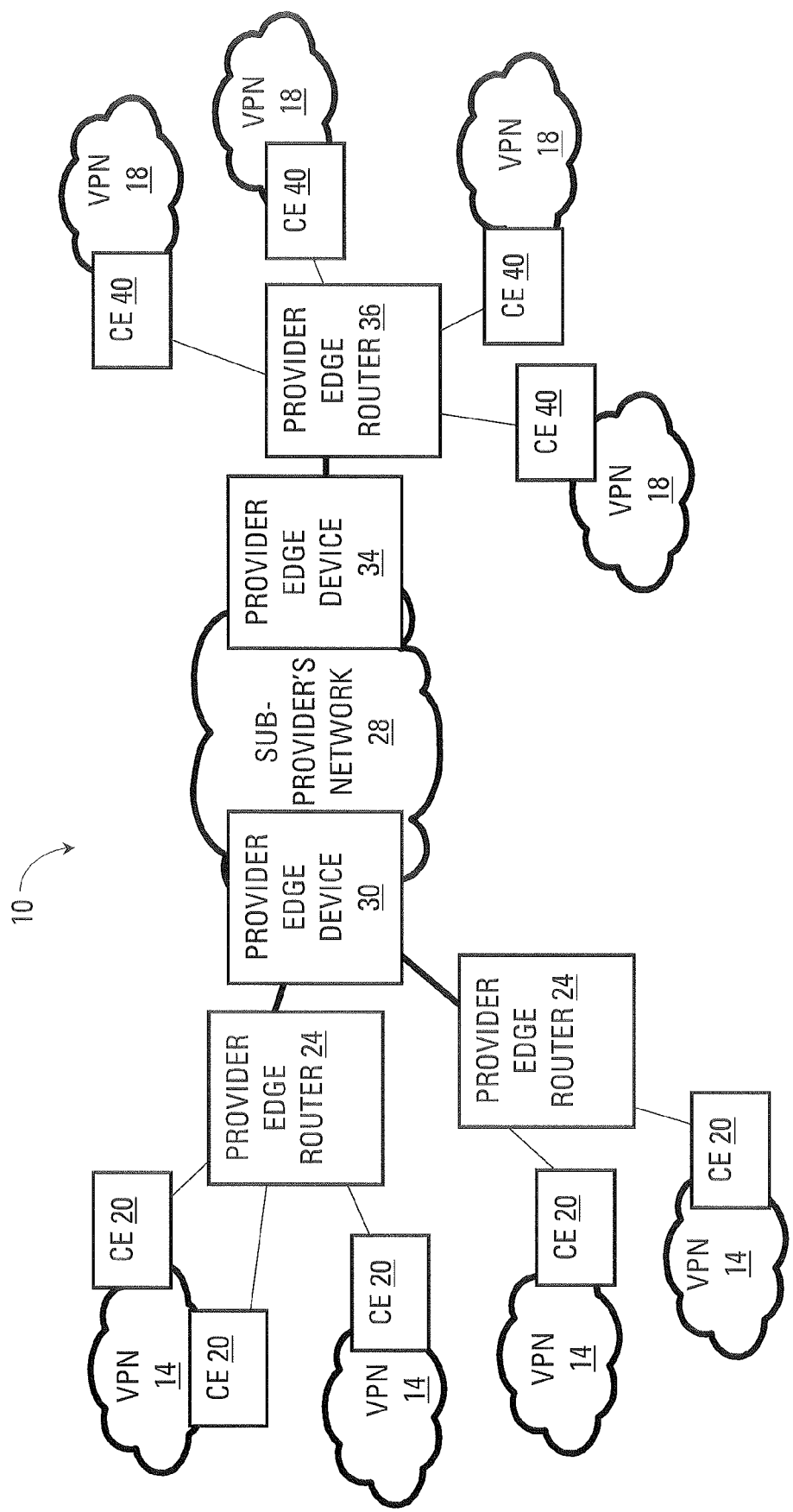
FIG. 1 is a schematic diagram illustrating a network reference model within which the apparatus and method of the invention can be utilized according to an embodiment of the invention.

Referring to FIG. 1, there is illustrated a network 10 connecting together VPNs 14 with remote VPNs 18. The VPNs 14 are customer networks which interface with a provider network via customer edge routers 20. Provider edge routers or switches 24 are associated with the provider network. The router 24 is a portion of the provider's network that interfaces with a particular VPN 14. This provider or first carrier provides layer-2, or layer-2 and layer-3 VPN services to its customers.

The provider routers 24 also interface with a network 28 of a sub-provider or second carrier. The sub-provider's network 28 connects to the provider's network via a provider edge device 30. The device 30 is a portion of the network 28. Portions of the network 28 may also interface with a backbone. An example of a backbone would be an Internet backbone. Of course those skilled in the art will appreciate that other types of backbones are possible.

The second carrier network includes one or more layer-1 VPN service bases. The second carrier provides layer-1 services or GVPN services to the first carrier.

GVPN service is a provider-provisioned VPN service that uses BGP as a VPN auto-discovery mechanism. BGP is an important protocol for VPNs and the Internet. BGP is also an Internet standard for inter-domain autonomous system (AS) exterior routing. Furthermore, BGP is the routing protocol employed on the Internet. All Internet Service Providers must use BGP to establish routing between one another.

GVPN service also uses GMPLS as a signaling and routing mechanism. One way of defining GMPLS is as follows. In a multi-protocol label switching (MPLS) network, incoming packets are assigned a label by a label edge router. Packets are forwarded along a label switch path where each label switch router makes forwarding decisions based solely on the contents of the label. At each hop, the label switch router strips off the existing label and applies a new label which tells the next hop how to forward the packet. GMPLS extends MPLS from supporting packet (PSC) interfaces and switching to include support of the following three classes of interfaces and switching: time-division multiplex (TDM), lambda switch (LSC) and fiber-switch (FSC).

The remote side of the network 10 can have an arrangement substantially mirroring the proximate side. A provider edge device 34 interfaces the network 28 with a remote network of a layer-2 VPN service provider. This remote service provider has a provider edge router or switch 36. The router 36 interfaces the network of the layer-2 VPN service provider with the network 28.

The router 36 also interfaces the remote network of the layer-2 service provider with one or more of the remote VPNs 18. The VPNs 18 interface with the remote network of the layer-2 VPN service provider via customer edge routers 40.

With respect to the layer-2 VPN provider edge routers or switches used in the network 10, previous implementations required the layer-2 VPN provider edge router or switch to implement a layer-2 VPN auto-discovery mechanism. Also, the operator needed to configure and manage n square, or at least a large number of BGP and with TCP sessions running on layer-2 VPN connections.

In one embodiment of the apparatus and method for distributing layer-2 VPN information, layer-2 VPN information is communicated between a layer-2 VPN provider edge router or switch and the sub-provider during a BGP session. At the layer-1 provider edge device, BGP/TCP sessions are established for the purpose of distributing layer-1 and layer-2 VPN information. In previous solutions, these layer-1 provider edge device BGPFTCP sessions were established for the purpose of distributing layer-1 VPN information only. That meant that it was at the layer-2 provider edge device that BGP/TCP sessions were established for the purpose of distributing layer-2 VPN information.

Figure 2:
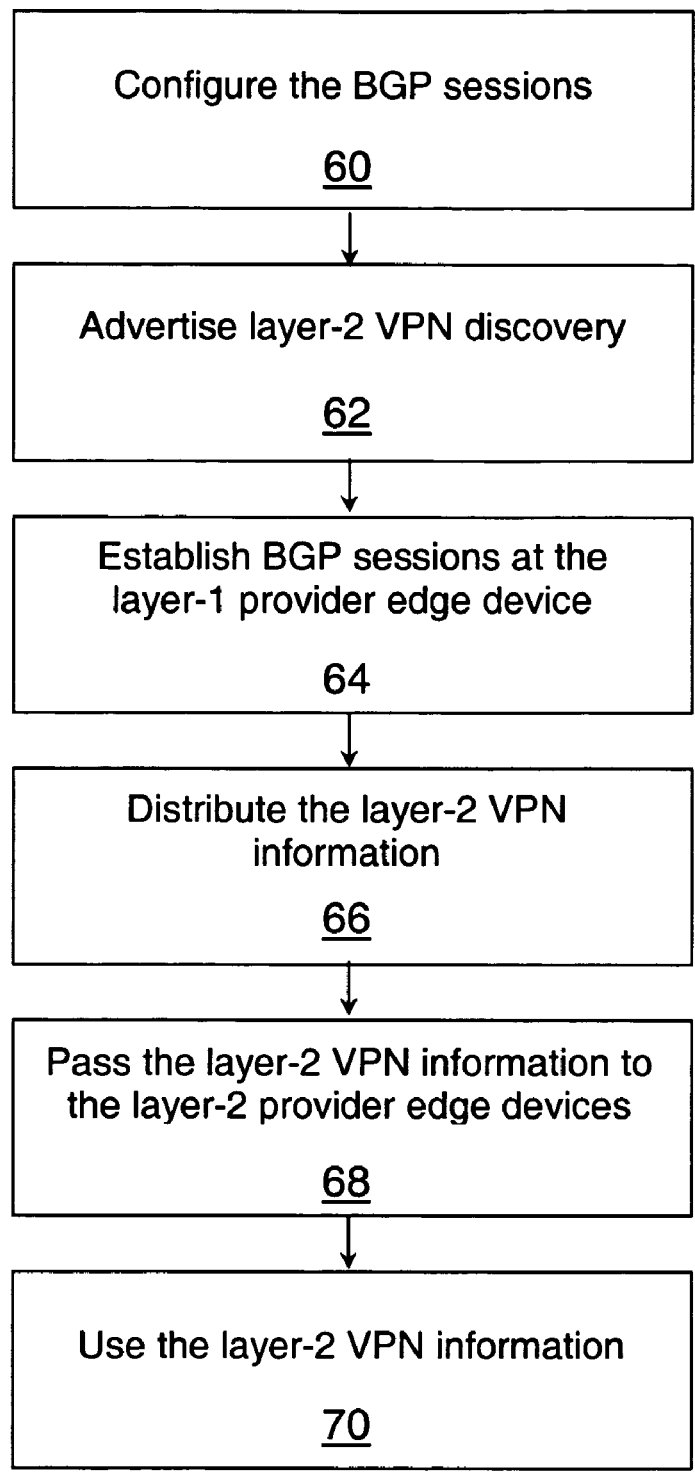
FIG. 2 is a flow diagram illustrating a method of operation implementable in the model of FIG. 1, the method of operating being in accordance with an embodiment of the invention.

FIG. 2 is a flow diagram illustrating the method of operation for outsourcing layer-2 VPN auto-discovery to a layer-1 and/or GMPLS-based VPN discovery mechanism. Starting at step 60, the BGP sessions are configured. For each layer-1 VPN service basis, one BGP session is set up between a layer-1 provider edge device (such as the device 30 of FIG. 1) and a layer-2 provider edge device (such as the device 24 of FIG. 1).

At step 62, the layer-2 provider edge device uses the BGP sessions of step 60 to advertise layer-2 VPN discovery to the attached layer-1 provider edge device.

At step 64, BGP sessions are established at the layer-1 provider edge device.

At step 66, the BGP sessions of step 64 are used in combination with a layer-1 VPN discovery mechanism to distribute the layer-2 VPN information to all remote layer-1 provider edge device(s) (such as the device 34 of FIG. 1).

At step 68, the remote layer-1 provider edge device(s) receive and pass the layer-2 VPN information to the attached layer-2 provider edge devices (such as the routers 40).

Finally, at step 70, the layer-2 VPN information is used within the first carrier network.

Glossary of Acronyms Used
BGP—Border Gateway Protocol
GMPLS—generalized MPLS
GVPN—generalized VPN
MPLS—multi-protocol label switching
VPLS—Virtual Private LAN Service
VPN—Virtual Private Network While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for distributing layer-2 VPN information comprising:
   at a first layer-1 provider edge device:
      receiving layer-2 VPN information, wherein said receiving said layer-2 VPN information comprises receiving advertising, wherein a mechanism for said advertising comprises at least one inter-carrier BGP session; and
      distributing said layer-2 VPN information to a second layer-1 provider edge device using BGP sessions and a discovery mechanism; and
   at said second layer-1 provider edge device:
      passing said layer-2 VPN information to an attached layer-2 provider edge device.

2. A method as claimed in claim 1 further comprising setting up, at said first layer-1 provider edge device, said inter-carrier BGP session to another provider edge device that is a selected one of the following: a layer-2 VPN-based provider edge device, and a layer-2 and layer-3 VPN-based provider edge device.

3. A method as claimed in claim 2 wherein said another provider edge device is a part of a provider network and said first layer-1 provider edge device is a part of a sub-provider network.

4. A method as claimed in claim 3 wherein said first layer-1 provider edge device and said second layer-1 provider edge device are separated by a backbone.

5. A method as claimed in claim 4 wherein said backbone includes a portion of the Internet.

6. A method as claimed in claim 5 wherein said another provider edge device interfaces with a VPN.

* * * * *

UNITED STATES PATENT AND TRADEMARK OFFICE
CERTIFICATE OF CORRECTION

PATENT NO. : 7,593,395 B2  Page 1 of 1
APPLICATION NO. : 10/747968
DATED : September 22, 2009
INVENTOR(S) : Hamid Ould-Brahim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1667 days.

Signed and Sealed this

Twenty-first Day of September, 2010

David J. Kappos
*Director of the United States Patent and Trademark Office*